United States Patent
Oudelaar

[11] Patent Number: 5,454,292
[45] Date of Patent: Oct. 3, 1995

[54] HYDRAULIC CIRCUIT COMPRISING AT LEAST TWO DOUBLE ACTING HYDRAULIC PISTON-CYLINDER DEVICES

[75] Inventor: Tone Oudelaar, Oldenzaal, Netherlands

[73] Assignee: Applied Power Inc., Butler, Wis.

[21] Appl. No.: 150,140

[22] PCT Filed: Apr. 5, 1993

[86] PCT No.: PCT/NL93/00079
§ 371 Date: Dec. 3, 1993
§ 102(e) Date: Dec. 3, 1993

[87] PCT Pub. No.: WO93/19947
PCT Pub. Date: Oct. 14, 1993

[30] Foreign Application Priority Data

Apr. 3, 1992 [NL] Netherlands ............ 9200628

[51] Int. Cl.6 ................................. F15B 11/02
[52] U.S. Cl. ................................. 91/446; 91/459
[58] Field of Search .............. 91/459, 465, 446

[56] References Cited

U.S. PATENT DOCUMENTS 2,390,425 12/1945 Crum ........................... 91/446
2,506,008 5/1950 Arps ............................. 91/446
4,630,523 12/1986 Tersteegen ..................... 91/1

FOREIGN PATENT DOCUMENTS

309066A1 3/1989 European Pat. Off. .
425156A3 5/1991 European Pat. Off. .

OTHER PUBLICATIONS

Energie Fluide et Lubrification, Feb. 2, 1963, p. 31.

Primary Examiner—F. Daniel Lopez
Attorney, Agent, or Firm—Quarles & Brady

[57] ABSTRACT

A hydraulic circuit comprising at least two double acting hydraulic piston-cylinder devices, for opening and closing a folding roof of a vehicle, with both ends of each piston-cylinder device each connected to a conduit supplied with pressurized fluid by a common hydraulic pump and to a return conduit leading to a source of hydraulic fluid, via 3/2 electrically activated valves. The 3/2 valves include a main ball (22) and seat (22a), with a check valve (32) of the ball seat type upstream of the main ball seat in a connection to the conduit supplied with pressurized fluid.

3 Claims, 4 Drawing Sheets

HYDRAULIC CIRCUIT COMPRISING AT LEAST TWO DOUBLE ACTING HYDRAULIC PISTON-CYLINDER DEVICES

Hydraulic circuit comprising at least two double acting hydraulic piston-cylinder devices, more particularly for opening and closing of a folding roof of a vehicle of the cabriolet type, in which both of the cylinder ends of each of the hydraulic piston-cylinder devices are each connected to a conduit supplied with pressurized fluid by a common hydraulic pump and to a return fluid conduit leading to a source of hydraulic fluid.

Such a circuit is known.

Separate piston-cylinder devices or pairs of piston-cylinder devices are often required for controlling the various parts of the folding roof and for actuating a hood to close a space within the vehicle for containing the roof in the folded state. In the well-known circuit the valves associated with each piston-cylinder device or pair of cylinder devices are formed by solenoid controlled spool valves of the 4/3 type i.e. valves having four points of connection and comprising a middle position in addition to two operative positions.

In connection with the desire and tendency to house the hydraulic control equipment in a smallest possible space, in general piston-cylinder devices of a rather small diameter and consequently relatively high pump pressures are involved, whereas the size of the valves is also very small. Such valves are very expensive and are, in the middle position, incapable of maintaining the pressure in a controlled cylinder, if subsequently a next cylinder is to be controlled under a substantially lower pressure. In such a case leakage of oil via the necessary clearance between the valve bore and the valve spool when the latter is in its middle position, can hardly be avoided, due to which the pressure in the respective cylinder may decrease to a value which is substantially beyond the pressure required for that cylinder to operate. It may thus happen that a roof tensioning bow which has been lifted from the stowing space by operating a certain cylinder, will thereafter partially move back into the storing space as a result of a decrease of the pressure in that cylinder and thereby interfere with the hood which at that moment is moving under a relatively low pressure to its closed position. Attempts to avoid these undesired incidents by using a precision fit between the valve bore and the valve spool have led to situations in which the power exerted by the energization of a valve appeared to be not sufficient to shift the valve spool in its bore.

The present invention aims at solving the above drawbacks in a simple and effective manner by using valves of a simpler and therefore less expensive structure which offer better security against loss of pressure in the respective cylinders.

In accordance with the invention this aim is achieved in that the electrically actuated valves are 3/2-valves, with a check valve of the ball valve type in the surface connection for the pressure conduit.

The type of valve used in accordance with the invention is of a substantially simpler and less expensive construction, whereas the check valve of the ball valve type associated therewith is a well working one.

The invention will be hereinafter further explained by way of example with reference to the accompanying drawing.

Figure 1:
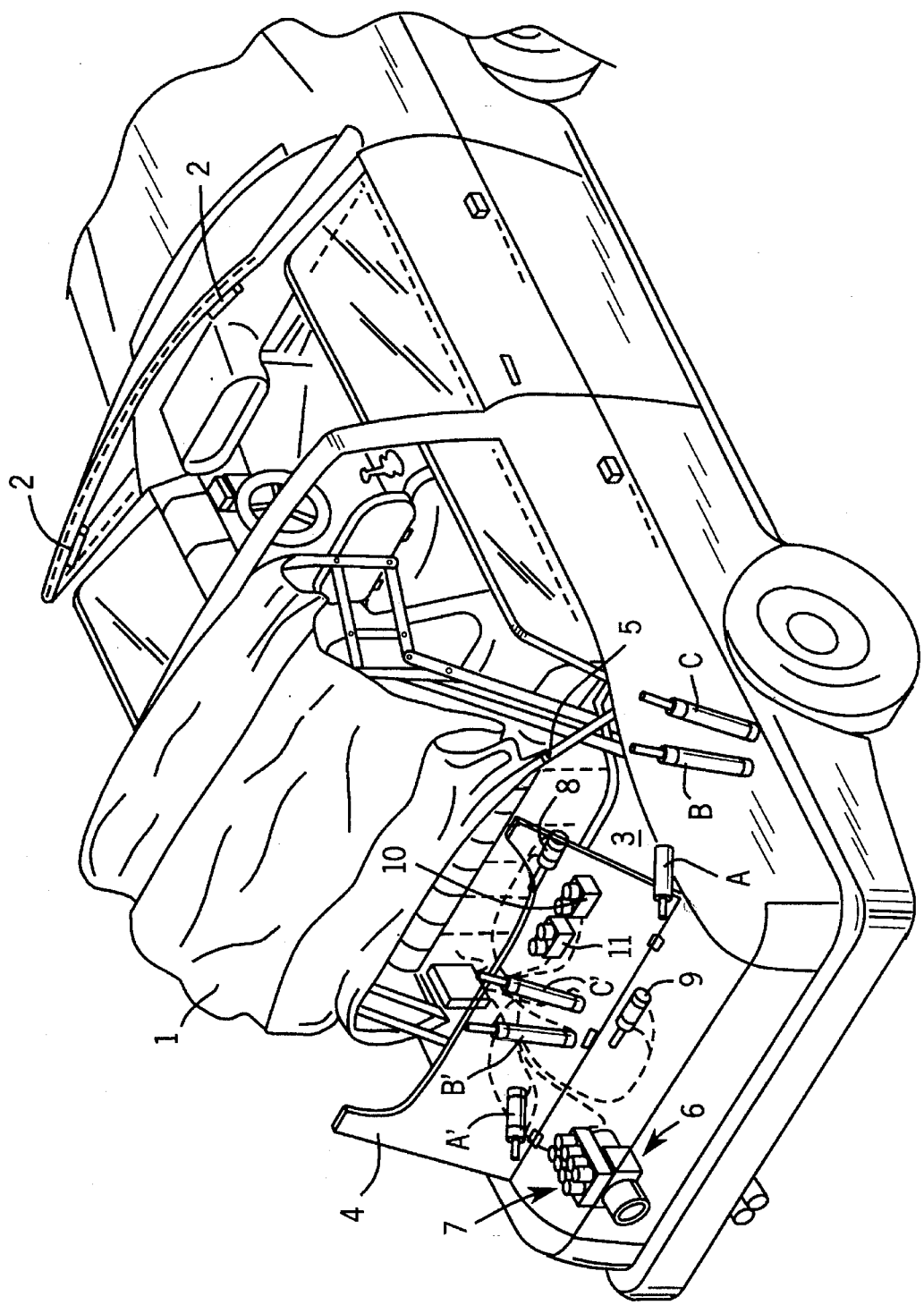
FIG. 1 is a perspective view of a motor vehicle of the cabriolet type, the folding roof of which is shown in a partially opened position, whereas also the pairs of hydraulic piston-cylinder devices for actuating the roof are shown.
Figure 4A:
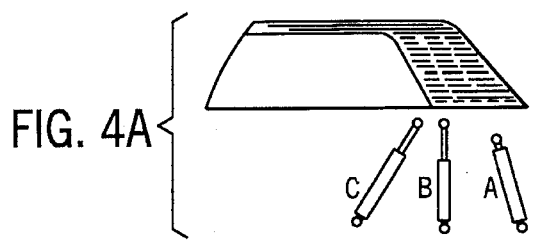
Figure 4B:
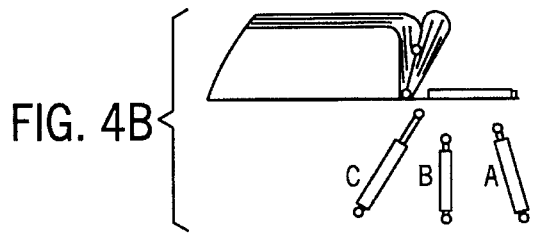
Figure 4C:
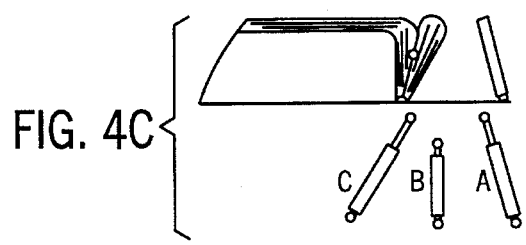
Figure 4D:
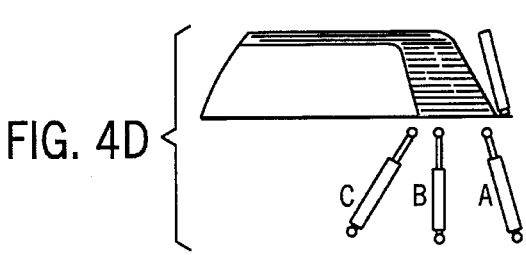
Figure 4E:
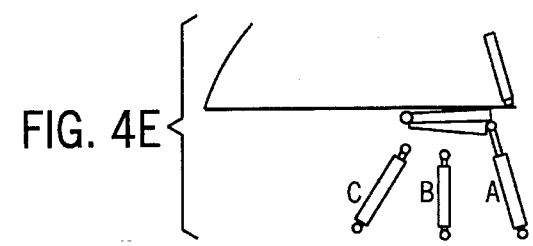
Figure 4F:
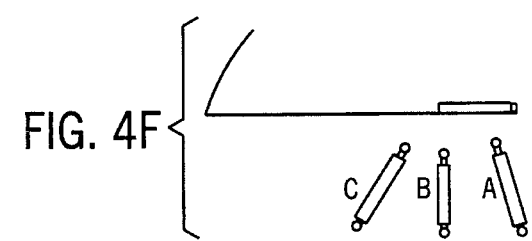
Figure 5:
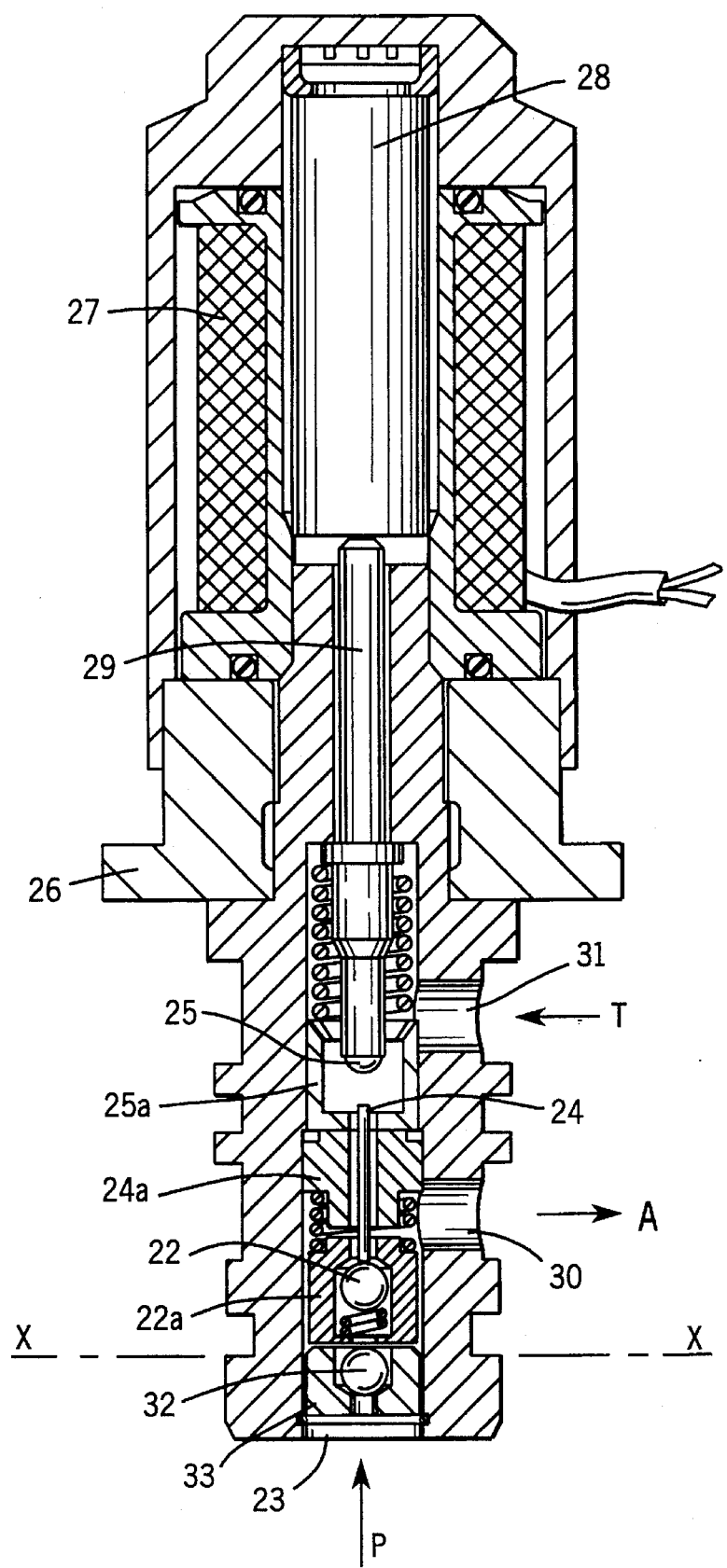

FIG. 3A–F show six successive phases of the closing procedure with the folding roof of a vehicle of the type according to FIG. 1;

FIG. 4A–F show in a diagrammatic manner the successive phases of the opening procedure of the folding roof and FIG. 5 shows a longitudinal section of a 3/2 valve of the ball seat type, with which—in accordance with the invention—an additional check valve of the ball valve type is used. With reference to FIG. 1 the folding roof is indicated at 1. In the closed position the forward edge of this roof is cooperating with the lock elements 2 in a manner which is well-known and therefore will not be further described.

In the completely folded position the folding roof 1 is accommodated in the space 3 which may be closed by a hood or cover 4.

The folding roof 1 has a rearward tensioning bow 5. In the closed position of the roof this bow lies on the cover 4 closing the empty space 3.

For opening and closing of the roof three pairs of hydraulic piston-cylinder devices A-A', B-B' and C-C' are provided. The piston-cylinder devices of each pair are operating in parallel and are each mounted on a side of the vehicle. The pair A-A' serves for the opening and closing of the cover 4, the pair B-B' for moving the tensioning bow 5 and the pair C-C' for the folding and stretching of the roof proper.

Furthermore a hydraulic power unit is indicated in FIG. 1 at 6, whereas the control valves for the various piston-cylinder devices have been assembled to a unit which is indicated at 7. The piston-cylinder devices 8 and 9 with the associated valve blocks 10 and 11 respectively which are also shown in FIG. 1 serve for the locking of the cover 4 and of the tensioning bow 5 respectively and will hereunder be left out of consideration.

Figure 2:
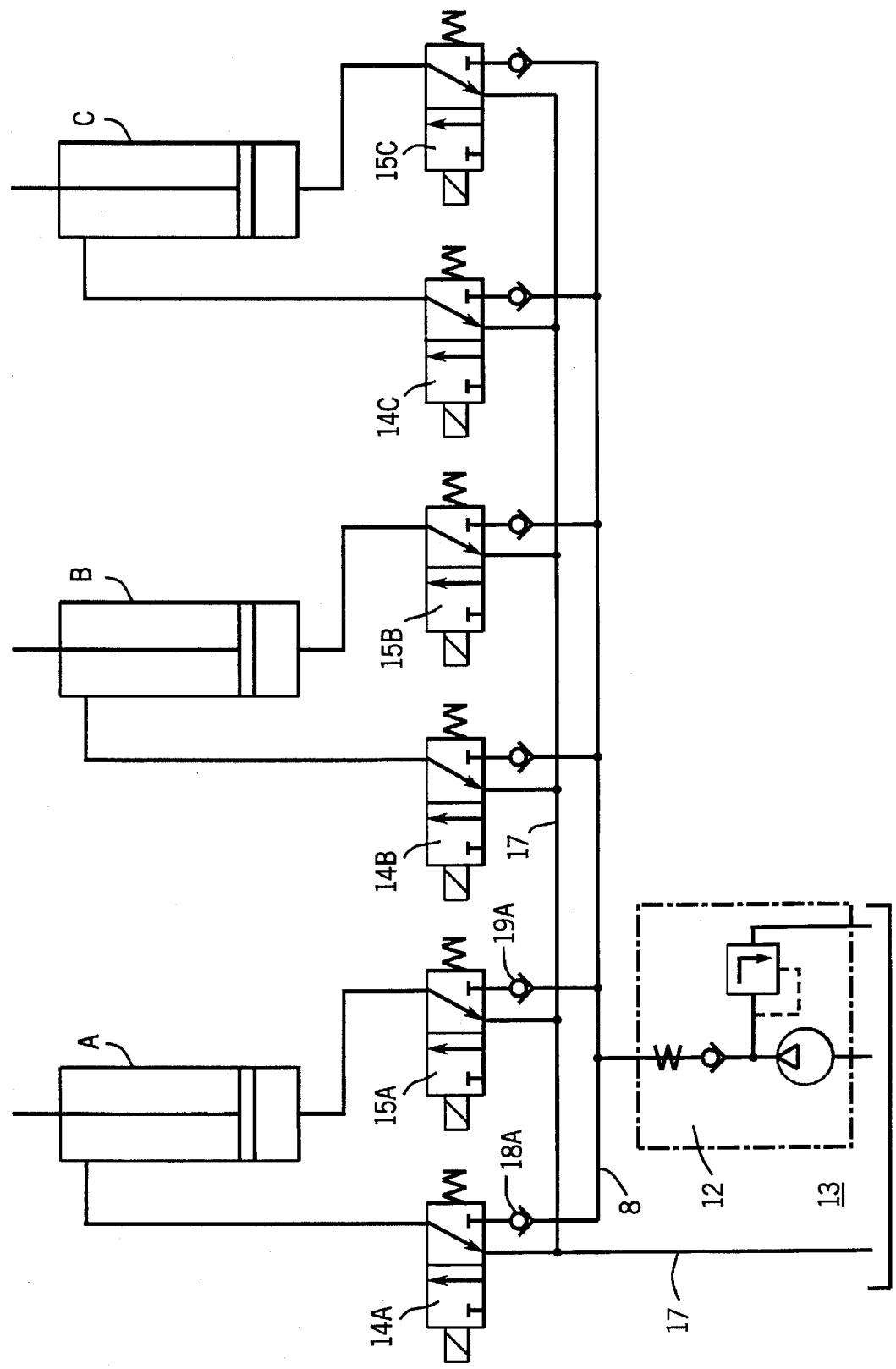
FIG. 2 shows a simplified hydraulic circuit according to the invention, with three hydraulic piston-cylinder devices.

For sake of simplicity the diagram of FIG. 1 shows only one piston-cylinder device A, B and C of each pair of simultaneously operating piston-cylinder devices A-A', B-B' and C-C' respectively. The power unit indicated at 6 in FIG. 1 is shown in FIG. 2 as comprising an electrically driven pump 12 and a hydraulic fluid reservoir 13. Furthermore the two control valves associated with each piston-cylinder device A, B and C respectively, have been indicated at 14A, 15A; 14B, 15B and 14C and 15C respectively. The pressure conduit leading from the pump 12 is indicated at 16, whereas the return conduit to the reservoir is indicated at 17.

As shown in the diagram of FIG. 2, the valves 14A–14C and 15A–15C are electrically actuated valves of the 3/2 type (i.e. three connections and two positions). In accordance with the present invention a ball check valve 18A, 18B and 18C respectively is provided in the connection with the pressure conduit 16 with each valve 14A–14C, whereas in a similar manner each valve 15A–15C has in its connection to the pressure conduit 16 a ball check valve 19A, 19B and 19C respectively. The valves 14A–14C and 15A–15C are, together with the electric motor of the pump 12, making part of an electrical circuit (not shown) determining the sequence in which the various valves are actuated and the associated piston-cylinder devices A–C are operated in the opening and closing procedure respectively of the roof.

In the diagram all of the piston-cylinder devices A–C are in the retractive position, whereas none of the six valves 14A–14C and 15A–15C are energized, so that both of the cylinder ends of all three piston-cylinder devices A–C are connected to the reservoir 13. In this position the roof 1 is accommodated in its folded position in the space 3 which is closed by the cover 4. This position is diagrammatically shown in FIG. 3A.

With reference to FIG. 3B–F it will now be described, how the roof is moved into its closed position.

Figure 3A:
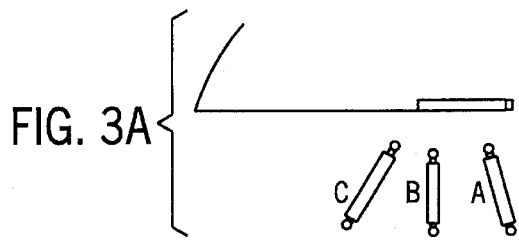
Figure 3B:
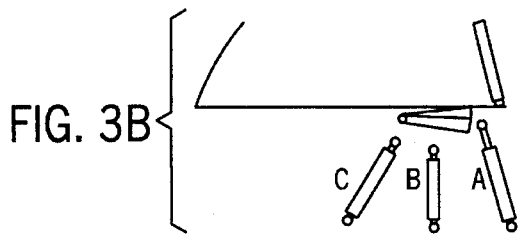
Figure 3C:
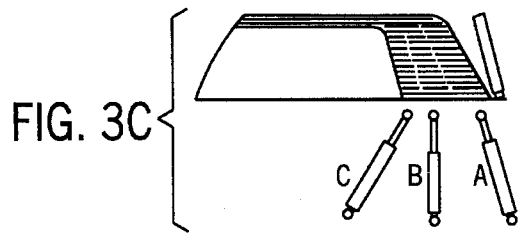
Figure 3D:
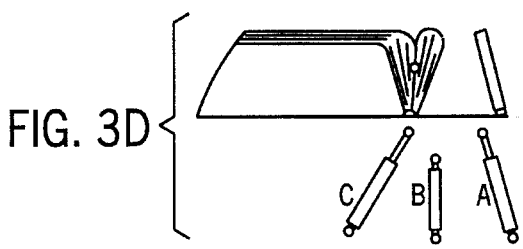
Figure 3E:
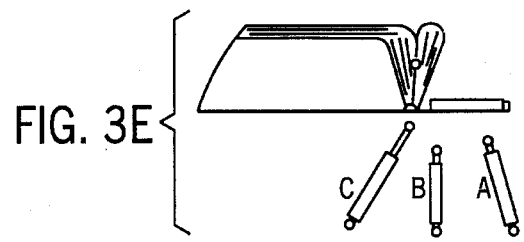

Suppression of a switch "close roof" (not shown) causes the hydraulic pump 12 to be put into operation for energizing the valve 15A in the diagram of FIG. 2, as a result of which the hydraulic cylinder A is moved into the extended position so as to open the cover 4 (see FIG. 3B). It is assumed that a pressure of 50 bar is required for opening the cover 4.

While the pump 12 keeps rotating and the valve 15A is maintained in the energized position, valve 15C is energized next, due to which the hydraulic cylinder C is extended and the roof 1 is elevated from the space 3 and is moved into the closed position. In this phase the cylinder B for the tensioning bow 5 is —while idling—taken along by the roof structure into the extended position (vide FIG. 3C). It is assumed that a pressure of 25 bar is required for this step. It is the ball check valve 19A in the pressure connection of the valve 15A which prevents the pressure in the cylinder A to lower also to 25 bar, at which pressure the opened position of the cover 4 would not be secured anymore. In such a situation the cover could e.g. by a gust of wind be urged from its opened position and thereby interfere with the passing roof defolding from the space 3.

In the subsequent phase—while the pump keeps operating and the valves 15A and 15C are kept energized—the valve 14B is energized, due to which the cylinder B is retracted again and the tensioning bow 5 will elevate the rearward part of the roof (including the back window). The latter step is required to be able to close the cover 4 again (see FIG. 3D). It is assumed that this step requires a pressure of 100 bar. This will cause the pressure side of the extended cylinders A and C to become also subjected to this pressure.

Figure 3F:
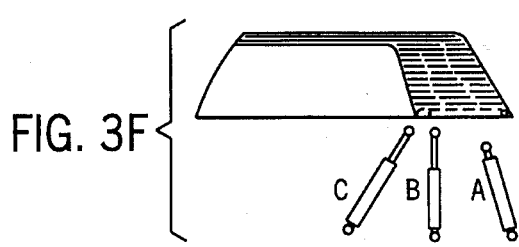

Thereafter—while the pump keeps rotating—the valve 15A is deenergized and the valve 14A is energized, while the valves 14B and 15C are kept energized. This causes the cylinder A to retract. It is assumed that this retracting movement involves a pressure of 10 bar. In this stage the ball check valves 18B and 19C prevent the pressure within the cylinder C and particularly that within the cylinder B from lowering to this value of 10 bar. This is of importance especially in respect to the pressure within the cylinder B, because the tensioning bow is under a substantial pulling force, so that a substantial reduction of the pressure within the cylinder B would allow the tensioning bow to move downwards and possibly interfere with the closing cover. This leads to the situation shown in FIG. 3E. In the last stage of the closing procedure of the roof the valve 14B is deenergized and the valve 15B is energized, while the pump keeps operating and the valves 14A and 14C remain energized. This causes the cylinder B to be extended, as a result of which the roof is closed on the rear side and tensioned (see FIG. 3F). As soon as the position shown in FIG. 3F is reached, the pump stops and all of the valves 14 and 15 are deenergized. The cylinders A and B are extended, whereas the cylinder C is taking the retracted position and all of the valves are "open". The latter position of the valves enables to actuate the roof by hand, also in those cases, in which an automatic control, e.g. because the electrical power source is exhausted, is not possible.

If in any intermediary stage of the above described opening procedure the pump would stop, e.g. by releasing the control button, the valves may be energized or kept energized respectively and the various ball check valves may—also in case of the pump pressure being completely lost—keep the respective cylinders in their latest position.

FIGS. 4A–4F show the successive stages which are passed through when opening the roof from the closed position in FIG. 4A. After the above explanation with reference to FIGS. 3A–3F, FIGS. 4B–F are considered self-explanatory.

FIG. 5 shows a 3/2 valve of the so called ball seat type, to which, in accordance with the present invention, an extra ball check valve is added. The valve part above the line x—x is well-known and essentially comprises a valve housing 21 which may be sealingly mounted within a bore of a valve block (see FIG. 1) with the intermediary of O-rings. 22 designates a valve ball, the associated seat ring 22a of which is fixedly mounted in a central bore 23 of the valve housing 21. Spaced above the seat ring 22a a second seat ring 25a is fixedly mounted in the bore 23. A guiding body 24a (of e.g. plastics material) provided between the two seat rings 22a and 25a is guiding a needle element 24 that extends with a substantial clearance through the valve openings of the two seat rings 22a and 25a. The seat ring 25a cooperates with a valve ball 25 provided at the lower end of a control stem 29. The control stem 29 is urged, by a spring 35, into its upper position, in which the upper end of the stem extends a certain distance beyond the upper surface of the valve housing 21. A top piece comprising a solenoid 27 and a core 28 is placed on the upper end of the valve housing 21.

In the deenergized state shown in the drawing, the core 28 is taking its upper position. In this deenergized stage, in which the ball valve end 25 is free from its seat, the two connections 30 and 31 are interconnected via passages within the guiding body 24a.

Upon energization the core 23 is pulled downwardly and presses the control stem 29 downwardly against spring action. The ball valve end 25 of the control stem 29 is thereby pressed on its seat, so that the connection between the so called T-connection 31 (to which the hydraulic fluid reservoir is to be connected) and the so-called A-connection 30 (which is to be connected to the respective cylinder space) is interrupted. The needle element 24 is pressed downwardly by the ball valve end 25 and in turn urges the valve ball 24 from its seat, so that via the lower end of the central bore 23 hydraulic fluid under pressure may be supplied, which may then flow, via the cleared valve opening in the seat ring 22a and the connection 30, towards the respective cylinder space.

In accordance with the invention a ball check valve, indicated at 32, is provided in the lower part of the central bore 23—below the line x—x. The seat ring 33 of the latter valve is fixedly mounted within the bore. The operation of this additional check valve has already been described hereinabove.

I claim:

1. A hydraulic circuit comprising at least two double acting hydraulic piston-cylinder devices for opening and closing of a folding roof of a vehicle of the cabriolet type in which both of the cylinder ends of each of the hydraulic piston-cylinder devices are each connected by an electrically actuated valve to a pressure conduit which is supplied with pressurized fluid by a common hydraulic pump and to a return fluid conduit leading to a source of hydraulic fluid, characterized in that said electrically actuated valves are 3/2-valves of a ball seat type having a main valve ball and seat, with a check valve of a ball valve type having an associated ball and seat ring upstream of said main valve seat in a connection to said pressure conduit.

2. A hydraulic circuit comprising at least two double acting hydraulic piston-cylinder devices for opening and closing of a folding roof of a vehicle of the cabriolet type in which both of the cylinder ends of each of the hydraulic piston-cylinder devices are each connected by an electrically actuated valve to a pressure conduit which is supplied with pressurized fluid by a common hydraulic pump and to a return fluid conduit leading to a source of hydraulic fluid, characterized in that one of said valves is provided for each end of each said cylinder, each said valve is a 3/2-valve having a first port connected to the associated cylinder end, a second port connected to said return fluid conduit and a third port connected to said pressure conduit, said first port of each said valve is normally in communication with said second port when said valve is deenergized, said first port is downstream of a ball type check valve and of a seat of a ball type main valve, a ball of said check valve opens in the downstream direction, a ball of said main valve opens in the upstream direction, said third port is upstream of said check valve, and said main valve is opened when said valve is energized thereby establishing communication between said third port and said first port.

3. A hydraulic circuit as claimed in claim 2, wherein communication between said first port and said second port is interrupted when said valve is energized.

* * * * *